United States Patent
Komachi

Patent Number: 5,907,381
Date of Patent: May 25, 1999

[54] LIQUID CRYSTAL DISPLAY UNIT AND METHOD FOR MANUFACTURING THE SAME

[75] Inventor: Yuichi Komachi, Tokyo, Japan

[73] Assignee: Machida Endoscope Co., Ltd., Tokyo, Japan

[21] Appl. No.: 08/925,639

[22] Filed: Sep. 9, 1997

[30] Foreign Application Priority Data

Sep. 11, 1996 [JP] Japan ................................ 8-262565

[51] Int. Cl.⁶ ..................... G02F 1/1339; G02F 1/1333
[52] U.S. Cl. ..................... 349/156; 349/155; 349/158
[58] Field of Search ................... 349/155, 156, 349/158

[56] References Cited

U.S. PATENT DOCUMENTS

| | | | |
|---|---|---|---|
| 5,262,778 | 11/1993 | Saunders | 341/34 |
| 5,419,991 | 5/1995 | Segawa | 430/20 |
| 5,665,136 | 9/1997 | Komachi | 65/102 |

FOREIGN PATENT DOCUMENTS

| | | |
|---|---|---|
| 0 321 118 | 6/1989 | European Pat. Off. . |
| 0 690 028 | 1/1996 | European Pat. Off. . |
| 23 44 040 | 3/1975 | Germany . |
| 57-191618 | 11/1982 | Japan . |
| 57-204027 | 12/1982 | Japan . |
| 58-028719 | 2/1983 | Japan . |
| 6-18902 | 1/1994 | Japan . |

*Primary Examiner*—William L. Sikes
*Assistant Examiner*—J. Kim
*Attorney, Agent, or Firm*—Fish & Richardson P.C.

[57] ABSTRACT

A liquid crystal display unit includes a first and a second substrate. A plurality of tiny projections are formed on the first substrate in a scattered arrangement. The tiny projections each have a generally semi-spherical configuration. Top portions of the projections each having a convexly curved surface are contacted with the second substrate, thereby a gap for filling a liquid crystal being formed between the first substrate and the second substrate. The tiny projections are formed by projecting a laser beam to the first substrate.

3 Claims, 2 Drawing Sheets

LIQUID CRYSTAL DISPLAY UNIT AND METHOD FOR MANUFACTURING THE SAME

BACKGROUND OF THE INVENTION

This invention relates to a liquid crystal display unit and a method for manufacturing the same. More particularly, the present invention relates to a spacer structure for maintaining a gap formed between two substrates in a liquid crystal display unit and a method for manufacturing such a spacer structure.

As known, a typical liquid crystal display unit comprises two substrates and a liquid crystal filled in a small gap (for example, 2 to 3 $\mu$m) formed therebetween, and its displaying function is exhibited by appropriately controlling the supply of voltage to the liquid crystal through plurality of electrodes which are arranged in a matrix pattern. In order to prevent displaying irregularity, it is necessary for such a liquid crystal display unit that the gap is formed uniformly so that the thickness of the liquid crystal to be filled in the gap will be uniform.

Conventionally, tiny spacers consisting of a large number of aluminum powders, glass beads and the like are sprayed to one of the two substrates, and the other substrate is placed on it such that tiny spacers are provided between the two substrates in a scattered arrangement, thereby uniformly maintaining a gap.

However, in the above-mentioned method, it is difficult to uniformly distribute the spacers on the substrate. Moreover, it is required to take a high level of an anti-dust countermeasure when the spacers are sprayed. Therefore, the cost is increased in the process for forming the gap.

In addition, in the construction in which a large number of spacers are provided between the two substrates in a scattered arrangement as mentioned above, the spacers tend to move when a liquid crystal is filled or due to long time use. Therefore, there is a possibility that the yield of production of the liquid crystal display units is decreased or the displaying function is degraded due to long time use.

In German Patent No. 2344050, a gap is formed between two substrates by a plurality of tiny projections formed on one of the two substrates and caused to contact the other substrate. However, since those tiny projections each have an annular configuration so that their sharp edges contact the other substrate, there is a possibility that the edges are broken.

European Patent No. 690028A1 discloses a method for forming tiny projections on a glass plate using a laser beam. However, since this method is developed for the use of forming micro lenses, it is irrelevant to the liquid crystal display unit.

SUMMARY OF THE INVENTION

It is an object of the present invention to provide a liquid crystal display unit in which a uniform gap can be formed between two substrates in a reliable manner.

According to a feature of the present invention, a liquid crystal display unit has two substrates, one of the two substrates is formed with a plurality of tiny projections each having a generally semi-spherical configuration, and top portions of the tiny projections each having a convexly curved surface are in contact with the other substrate, so that a gap is formed between the two substrates.

According to a further feature of the present invention, the tiny projections are formed using an energy beam.

DETAILED DESCRIPTION OF THE EMBODIMENT

Figure 1:
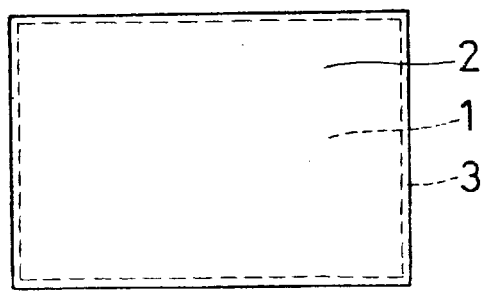
FIG. 1 is a plan view of a liquid crystal display unit according to one embodiment of the present invention.
Figure 4:
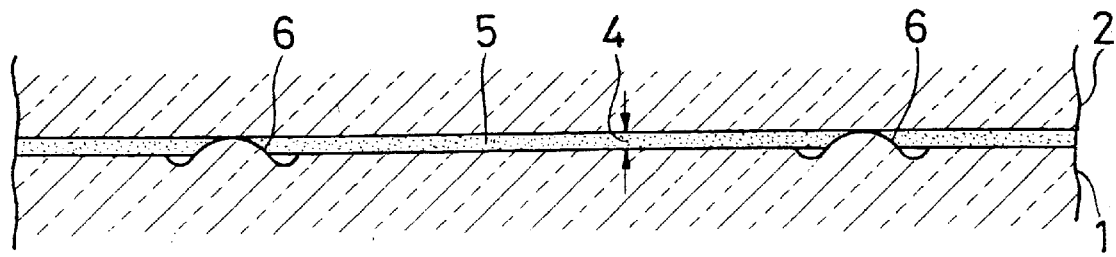
FIG. 4 is an enlarged sectional view of the two substrates between which a gap is ensured by the tiny projections.

One embodiment of the present invention will now be described with reference to the drawings. As shown in FIGS. 1 and 4, a liquid crystal display unit according to this embodiment has a closed space, namely, small gap 4 which is formed by placing two substrates 1, 2 one upon the other. The substrates 1 and 2 are attached together by an adhesive agent 3 or the like applied to peripheral edges thereof. This gap 4 is filled with a liquid crystal 5.

Figure 2:
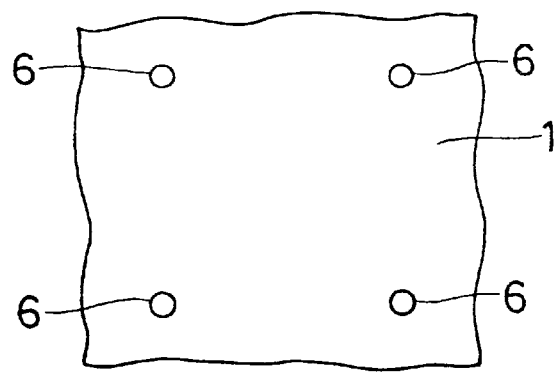
FIG. 2 is an enlarged plan view of tiny projections formed on one of the two substrates which the liquid crystal display unit has.
Figure 3:
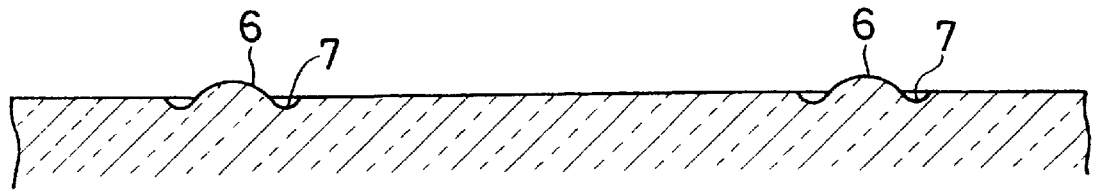
FIG. 3 is an enlarged sectional view of the tiny projections.

As shown in FIGS. 2 through 4, a plurality of tiny projections 6 serving as spacers are formed on a surface of the substrate 1 (first substrate) opposite to a surface of the substrate 2 (second substrate). The tiny projections 6 are uniformly scattered in a matrix pattern over the entire surface of the first substrate 1. The tiny projections 6 each have a generally semi-spherical configuration. Top portions of the tiny projections 6 each have a convexly curved surface (substantially spherical surface). All the tiny projections 6 are generally equal in height. The height is 10 $\mu$m or less (for example, 2 to 3 $\mu$m).

The top portions of the tiny projections 6 uniformly scattered on the substrate 1 contact the other substrate 2, so that the gap 4 is uniformly maintained between the first substrate 1 and the second substrate 2. The tiny projections 6 are formed on the substrate 1 and incapable of movement unlike the conventional spacer beams. Therefore, the uniformly scattered arrangement of the tiny projections 6 is maintained in a reliable manner when a liquid crystal is filled or even after long time use. As a consequence, the uniform gap 4 can be maintained over its entire area. Accordingly, the decrease in yield of production of liquid crystal display units occurrable in the manufacturing process and irregularity of the liquid crystal displaying function caused by long time use can be minimized. Since the top portions of the tiny projections 6 each have a convexly curved surface, the tiny projections 6 are hardly broken when they contact the second substrate 2. The gap 4 can also be maintained in a reliable manner owing to this feature.

Figure 5:
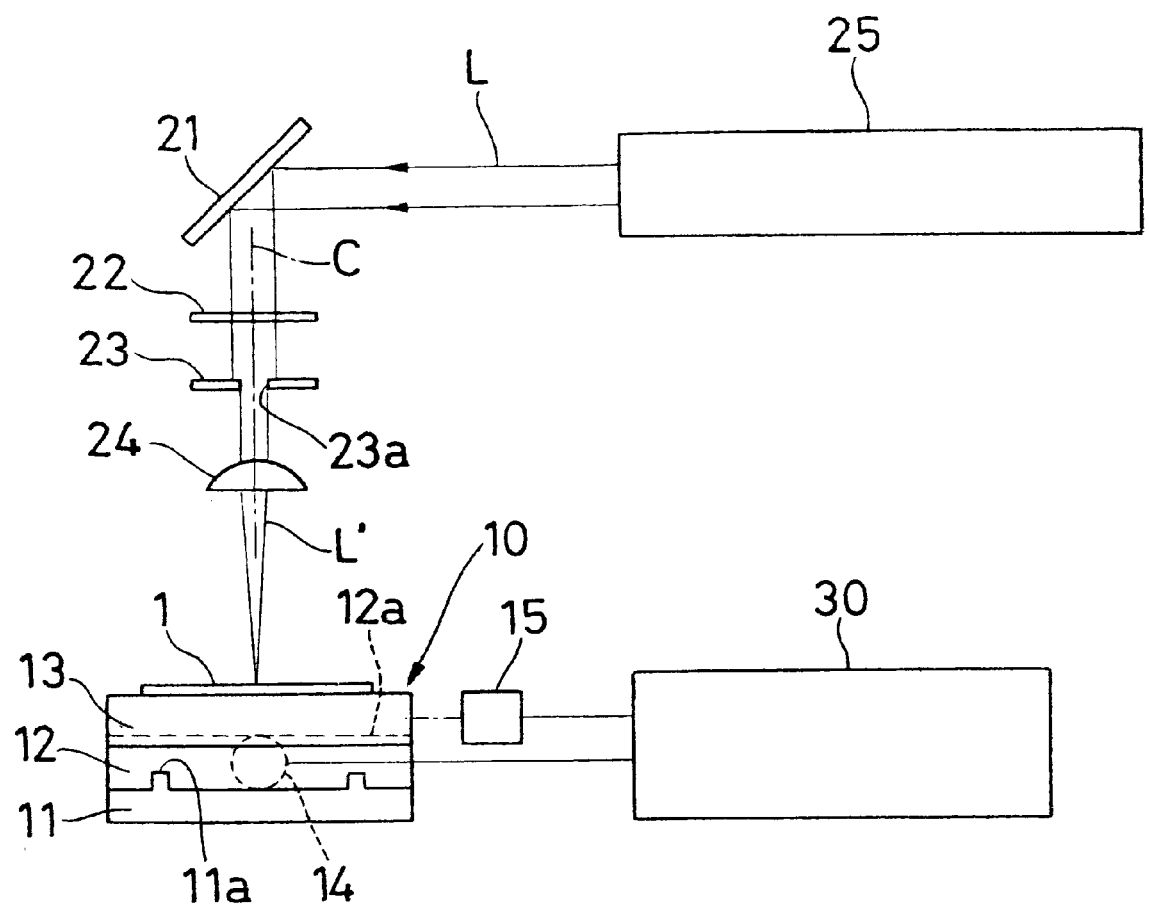
FIG. 5 is a side view showing a device for forming such tiny projections.

A device and a method for forming the tiny projections 6 will be described next. As shown in FIG. 5, this device includes a moving mechanism 10 for horizontally moving the substrate 1. This moving mechanism 10 includes a base 11, a Y-stage 12, and an X-stage 13. The Y-stage 12 is capable of moving horizontally in a direction vertical to the surface of the paper through a rail 11a which is formed on an upper surface of the base 11. The X-stage 13 is capable of moving leftwardly and rightwardly (i.e., perpendicular direction to a direction of the movement of the Y-stage 12) in FIG. 5 through a rail 12a which is formed on an upper surface of the Y-stage 12. The stages 12, 13 are caused to move, for example, by small-sized precision motors 14, 15 through screw mechanisms (not shown) or the like, respectively. The motors 14, 15 are intermittently driven by a control unit 30.

Immediately above the moving mechanism 10, there are a copper mirror 21, an aluminum shutter 22, an aluminum diaphragm 23, a convex lens 24 (beam converging member) of zinc selenide (ZnSe), which are all arranged in this order from the top along a vertical optical axis C. The mirror 21 is inclined at an angle of 45 degrees. There is a $CO_2$ laser generator 25 ((energy beam generator) which is arranged laterally next to the mirror 21. The shutter 22 and the laser generator 25 are controlled by the control unit 30. The diaphragm 23 is of a planar shape and has a complete round aperture 23a at its center.

A method for forming spacers using the above device will now be described. First, the substrate 1 is removably set on the center of an upper surface of the X-stage 13 using a fixing instrument, not shown. The upper surface (opposite surface to the substrate 2) of the substrate 1 thus set is held in a horizontal posture and perpendicular to the optical axis C.

The substrate 1 is preferably made of no-alkali glass (merchandise name: CORNING 7059), bolo-silicated glass (merchandise name: PYREX), or the like, having heat-resisting properties, low expansion properties, high-viscous properties. The other substrate 2 may or may not be made of the same material as the first substrate 1.

After the substrate 1 is set, the motors 14, 15 are driven by the control unit 30, so that a comer point (for example, upper left comer when viewed from above) of the substrate 1 is brought into alignment with the optical axis C. On the other hand, in response to an operation instructing signal from the control unit 30, a parallel laser beam L (energy beam) is output horizontally from the laser generator 25. The laser beam L proceeds to the mirror 21 and is reflected by the mirror 21. The reflected laser beam L passes through the shutter 22 downwardly along the optical axis C while the shutter 22 is opened for a prescribed time under the control of the control unit 30. Then, the laser beam L passes through the diaphragm 23 and converged by the convex lens 24 so as to be supplied to the upper surface of the substrate 1. A focusing point of the converged laser beam L' (converged energy beam) is biased either upwardly or downwardly from this upper surface. By doing so, a spot diameter is set, for example, to about 50 $\mu$m on the upper surface of the substrate 1. It should be noted that this focusing position may be coincident with the upper surface.

The energy level of the converged laser beam L' should be high enough to locally melt the substrate 1 but it should not be higher than necessary.

On the upper surface of the substrate 1, the part applied with the converged laser beam L' is heated and melt. The melted glass material is swollen, as shown in FIG. 3, under the effect of surface tension, and then left as being cooled and hardened. As a consequence, the swollen portions, namely, tiny projections (for example, 3 $\mu$m in height) 6 and annular grooves 7 around the tiny projections 6 are formed.

Since the glass material to be used is comparatively high in viscosity when the glass material is in its melted condition, it can be swollen into a semi-spherical configuration under the effect of surface tension. Moreover, since the glass material to be used is comparatively low in thermal expansion, crack caused by thermal stress applicable when the glass material is being hardened can be prevented from occurring.

The tiny projections 6 are formed on the upper left corner in the manner mentioned above. Thereafter, the tiny projections 6 are formed one after another by projecting the converged laser beam having the same energy level to the first substrate 1 every time the substrate 1 is stopped, while intermittently moving the substrate 1 on a horizontal plane by the moving mechanism 10. By doing so, a large number of tiny projections 6 are finally equally distributed over the entire area of the substrate 1 in a matrix pattern.

According to the above method, since the tiny projections 6 are formed by projection of a laser beam, production is comparatively simple. Moreover, the tiny projections can be uniformly distributed in a scattered arrangement. In addition, since it is not required to take a high level of an anti-dust countermeasure, the manufacturing cost can be reduced. Also, by utilizing the surface tension of the melted glass material, there can be obtained the tiny projections 6 of high precision and excellent in symmetry. The height of each tiny projections 6 can easily be varied by varying the spot diameter.

In the above device, the spot diameter of the converged laser beam L' on the upper surface of the first substrate 1 can be adjusted by replacing the diaphragm 23 with another diaphragm 23 having an aperture 23a of a different size. The shape of the aperture 23a is not necessarily required to be a complete round. A diaphragm 23 having an aperture 23a of a different shape (for example, oblong) may be employed. In that case, since the shape of the spot of the laser beam L' on a surface 50a of the substrate 1 is oblong, for example, the tiny projections 6 to be manufactured are also oblong, for example, in shape.

After the tiny projections 6 are formed on the substrate 1 in the manner as mentioned above, the second substrate 2 is placed on the substrate 1 in such a way to contact the tiny projections 6 and attached together through a adhesive agent 3 applied to peripheral edges thereof. Thereafter, a liquid crystal is filled in the gap formed between the first substrate 1 and the second substrate 2 from a port formed between the peripheral edge of the first substrate 1 and the peripheral edge of the second substrate 2.

The present invention is not limited to the above embodiment and various modifications can be made. The laser to be used is preferably a $CO_2$ laser which is readily absorbed by glass. Other lasers having a wavelength readily absorbed especially by glass, such as Er-YAG laser and excimer laser, may also be used. Of course, if efficiency in energy can be disregarded, many other lasers can be used.

It is also an interesting alternative that when the tiny projections are formed one after another, the laser beam generator is moved instead of moving one of the substrates.

In case the energy level of the laser beam is high, it is also accepted that a mask made of a laser reflecting material such as aluminum, having a plurality of apertures arranged in a matrix pattern on the surface of the substrate is located on the optical path C. A parallel laser beam is projected to generally over an entire surface of the substrate through the mask. In that case, a plurality of tiny projections are arranged in a matrix pattern on the surface of the substrate corresponding to the apertures of the mask, and no moving mechanism for the substrate is required.

It is also an interesting alternative that the substrate is divided into plural sections and a plurality of tiny projections are formed on each section at a time using the above mask, so that their adjacent area can be moved to the laser beam receiving area by moving the substrate using the moving mechanism.

It is also accepted that a plurality of tiny projections are formed on the substrate simultaneously, by splitting the laser beam using a beam splitter.

The energy beam to be used may be an electron beam or a plasma beam. In case an electronic beam or the like is used, the beam is converged by a known beam converging means consisting of an electromagnetic coil, etc. and then supplied to the substrate.

What is claimed is:

1. A method for manufacturing a liquid crystal display unit comprising the steps of:

(a) projecting an energy beam to a surface of a first substrate made of glass material to locally heat and melt the surface of said first substrate, so that a plurality of generally semi-spherical tiny projections whose top portions each having a convexly curved surface is formed as spacers, said plurality of tiny projections being formed on said first substrate in a scattered arrangement; and (b) placing a second substrate upon said first substrate with said second substrate contacted with the top portions of said tiny projections, thereby a gap for filling a liquid crystal being formed between said first substrate and said second substrate.

2. A method for manufacturing a liquid crystal display unit according to claim 1, in which a parallel laser beam is output as said energy beam, and said parallel laser beam is converged by a lens and supplied to said first substrate in a direction perpendicular to said first substrate.

3. A method for manufacturing a liquid crystal display unit according to claim 2, wherein said first substrate is intermittently moved on a plane perpendicular to said converged laser beam and said converged laser beam is supplied to the surface of said first substrate every time said first substrate stops, so that said plurality of tiny projections are formed thereon in a matrix pattern.

* * * * *